(12) United States Patent
Long et al.

(10) Patent No.: US 8,975,208 B2
(45) Date of Patent: Mar. 10, 2015

(54) DESULFURIZING ADSORBENT, PREPARING PROCESS AND USE THEREOF

(75) Inventors: Jun Long, Beijing (CN); Huiping Tian, Beijing (CN); Wei Lin, Beijing (CN)

(73) Assignees: China Petroleum Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 757 days.

(21) Appl. No.: 13/142,946

(22) PCT Filed: Dec. 30, 2009

(86) PCT No.: PCT/CN2009/001592
§ 371 (c)(1),
(2), (4) Date: Jul. 28, 2011

(87) PCT Pub. No.: WO2010/075672
PCT Pub. Date: Jul. 8, 2010

(65) Prior Publication Data
US 2011/0272328 A1   Nov. 10, 2011

(30) Foreign Application Priority Data

Dec. 31, 2008  (CN) .......................... 2008 1 0246691
Feb. 27, 2009  (CN) .......................... 2009 1 0078395

(51) Int. Cl.
| | |
|---|---|
| *B01J 20/04* | (2006.01) |
| *B01J 20/06* | (2006.01) |
| *B01J 20/08* | (2006.01) |
| *B01J 20/10* | (2006.01) |
| *C10G 25/09* | (2006.01) |
| *C10G 25/00* | (2006.01) |
| *B01J 20/28* | (2006.01) |
| *B01J 20/30* | (2006.01) |
| *B01J 20/32* | (2006.01) |

(52) U.S. Cl.
CPC .............. *C10G 25/003* (2013.01); *C10G 25/09* (2013.01); *B01J 20/041* (2013.01); *B01J 20/06* (2013.01); *B01J 20/08* (2013.01); *B01J 20/103* (2013.01); *B01J 20/28004* (2013.01); *B01J 20/28019* (2013.01); *B01J 20/2803* (2013.01); *B01J 20/3007* (2013.01); *B01J 20/3078* (2013.01); *B01J 20/3085* (2013.01); *B01J 20/3204* (2013.01); *B01J 20/3236* (2013.01); *B01J 2220/42* (2013.01); *B01J 2220/56* (2013.01); *C10G 2400/04* (2013.01); *C10G 2300/104* (2013.01); *C10G 2300/1044* (2013.01); *C10G 2300/1055* (2013.01); *C10G 2300/202* (2013.01); *C10G 2400/02* (2013.01)
USPC ........... 502/407; 502/406; 502/415; 502/241; 502/247; 502/252; 502/253; 502/258; 208/244; 208/245; 208/247; 208/249

(58) Field of Classification Search
CPC ........ C10G 25/03; C10G 25/05; C10G 25/09; C10G 25/003; B01J 20/04; B01J 20/041; B01J 20/103; B01J 20/16; B01J 20/08; B01J 20/3007; B01J 20/3078; B01J 20/3202
USPC ......... 502/241, 247, 251–253, 258–260, 406, 502/407, 415
See application file for complete search history.

(56) References Cited

U.S. PATENT DOCUMENTS

| | | | |
|---|---|---|---|
| 3,976,561 A | 8/1976 | Eyles | |
| 6,150,300 A | 11/2000 | Khare et al. | |
| 6,271,173 B1 | 8/2001 | Khare | |
| 6,683,024 B1 | 1/2004 | Khare et al. | |
| 6,955,752 B2 * | 10/2005 | Dodwell | 208/247 |
| 2003/0032555 A1 | 2/2003 | Dodwell | |
| 2003/0064889 A1 | 4/2003 | Sughrue et al. | |
| 2003/0114299 A1 | 6/2003 | Khare | |
| 2006/0081499 A1 * | 4/2006 | Khare | 208/15 |

FOREIGN PATENT DOCUMENTS

| | | |
|---|---|---|
| CN | 1130253 A | 9/1996 |
| CN | 1151333 A | 6/1997 |
| CN | 1208124 A | 2/1999 |
| CN | 1295110 A | 5/2001 |
| CN | 1384770 A | 12/2002 |
| CN | 1130253 C | 12/2003 |
| CN | 1542087 A | 11/2004 |

(Continued)

OTHER PUBLICATIONS

Russian Office Action dated Jun. 19, 2013 issued in related Russian Patent Application No. RU 2011131329 A, with English-language translation.

(Continued)

*Primary Examiner* — Renee E Robinson

(74) *Attorney, Agent, or Firm* — Scully, Scott, Murphy & Presser P.C.

(57) ABSTRACT

The present invention provides an adsorbent for removing sulfur from cracking gasoline or diesel fuel. The adsorbent has excellent abrasion-resistance and desulfurization activity. The adsorbent comprises from about 5 to about 35 wt % of alumina, from about 3 to about 30 wt % of silica, from about 10 to about 80 wt % of at least one oxide of metal selected from Groups IIB and VB, from about 3 to about 30 wt % of at least one metal accelerant selected from Groups VIIB and VIII, and from about 0.5 to about 10 wt % of at least one oxide of metal selected from Groups IA and IIA, based on the total weight of the adsorbent.

20 Claims, 1 Drawing Sheet

(56) References Cited

FOREIGN PATENT DOCUMENTS

| | | |
|---|---|---|
| CN | 1208124 C | 6/2005 |
| CN | 1627988 A | 6/2005 |
| CN | 1766047 A | 5/2006 |
| CN | 1258396 C | 6/2006 |
| CN | 1856359 A | 11/2006 |
| CN | 1871063 A | 11/2006 |
| CN | 1258396 A | 8/2011 |
| JP | 51-89890 | 8/1976 |
| JP | 6-91164 | 4/1994 |
| JP | 11-61154 | 3/1999 |
| JP | 2000-202279 | 7/2000 |
| JP | 2001232202 A | 8/2001 |
| JP | 2004-230317 | 8/2004 |
| JP | 2006-528547 | 12/2006 |
| RU | 2 309 795 C2 | 6/2005 |
| WO | WO 01/32304 A1 | 5/2001 |
| WO | WO 03/086621 A1 | 10/2003 |

OTHER PUBLICATIONS

International Search Report dated Apr. 15, 2010 issued in corresponding International Application No. PCT/CN2009/001592.

Van Der Meer, Y. et al., "Characterization and Thiophene Hydrodesulferization Activity of Amorphous-silica alumina-supported NiW Catalysts" Journal of Catalysis (Dec. 10, 2004) pp. 433-446, vol. 228.

Hui, W. et al., "Research on Support in Hydrodesulfurization Catalysts" Journal of Wuhan University of Technology (Mar. 2006) vol. 28, No. 3; together with English-language abstract.

Saudi Arabian Official Action dated Aug. 19, 2014 corresponding to Saudi Arabian Patent Appln. No. 110310032 (English Language Translation Only).

\* cited by examiner

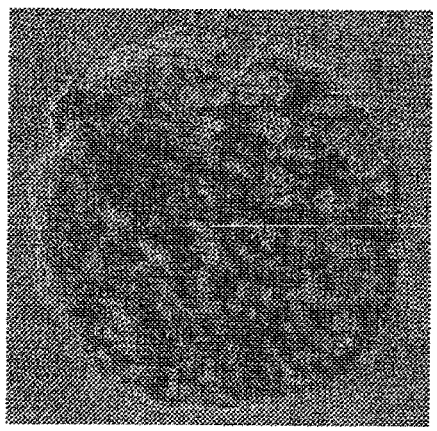
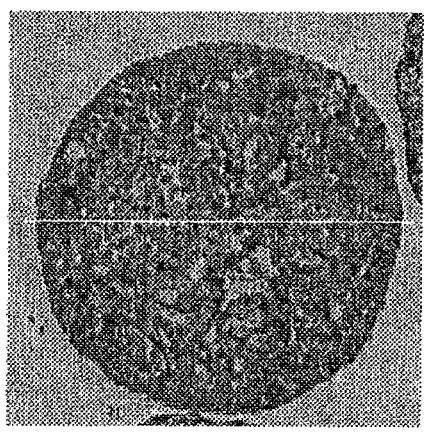
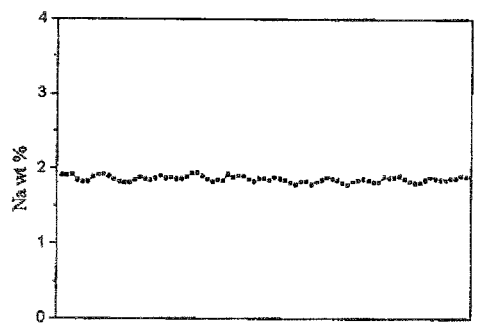
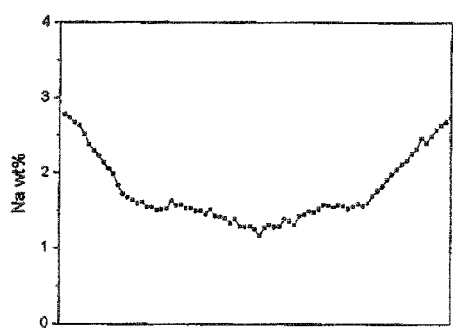
Fig.1-1 The lateral distribution of sodium in adsorbent A3
Fig.1-2 The lateral distribution of sodium in adsorbent B5

US 8,975,208 B2

DESULFURIZING ADSORBENT, PREPARING PROCESS AND USE THEREOF

FIELD OF THE INVENTION

The present invention relates to an adsorbent composition which is suitable for desulfurizing cracking gasoline or diesel fuel.

BACKGROUND OF THE INVENTION

The sulfur oxides produced from combustion of sulfur in vehicle fuel inhibit the activity of the noble metal catalyst in the converter for exhaust gas and poison the catalyst irreversibly. Consequently, the exhaust gas comprises unburned non-methane hydrocarbons, nitrogen oxide and carbon monoxide, all of which easily form photochemical smog when catalyzed by sunlight, resulting in acidic rain. Meanwhile, sulfur oxides in the air are one of the major reasons for forming acidic rain. With increasing recognition of environmental protection and stricter environmental regulations, it is believed that decreasing the sulfur content in gasoline or diesel fuel is one of the most important measures to improve the air quality.

In China, most sulfur contained in gasoline comes from heat processed gasoline, which is mainly catalytic cracking gasoline. Therefore, decreasing the sulfur content in the cracking gasoline would facilitate reducing sulfur content of these gasolines. The current standard for gasoline product is GB 17930-2006 "Motor Vehicle Gasoline," which further restricts the sulfur content of gasoline and requires that by Dec. 31, 2009 the sulfur content of gasoline should be lowered to 50 ppm. Under this circumstance, catalytic cracking gasoline must be desulfurized deeply to meet the environmental requirement.

While lowering the sulfur content of motor vehicle fuel, it should avoid changes in olefin content which leads to a reduction of octane number (including Research Octane Number, ROM and Motor Octane Number, MON) to retain the combustion characteristics of the motor vehicle fuel. Generally, the negative effect on the olefin content is caused by the hydrogenation reaction induced upon removal of thiophene compounds (including thiophenes, benzothiophenes, alkylthiophenes, alkylbenzothiophenes and alkyldibenzothiophenes). Further, it should avoid loss of aromatic hydrocarbons in the cracking gasoline due to saturation under hydrogenation condition. Therefore, the most desirable approach is to desulfurize the gasoline with retaining its octane number.

On the other hand, both hydrodesulfurization and hydrogenation of unsaturated hydrocarbons consume hydrogen, which increases the cost of the desulfurization. Accordingly, there is a need for a method of desulfurization without consuming large volume of hydrogen, for example the S Zorb adsorption desulfurization technology, thereby providing more economical methods for treatment of cracking gasoline or diesel fuel.

Traditionally, a fixed-bed process is usually used for desulfurization in a liquid phase. However, this process is inferior in the homogeneity of reaction and the regeneration of the material. As compared with the fixed-bed process, fluidized-bed process is more advantageous with wide applications prospects in the future because of its better performance in heat transfer and pressure drop. Fluidized-bed reactor is usually provided with granular reactants. However, for most reactions, the reactants do not have enough abrasion-resistance. Accordingly, it is of great significance to find an adsorbent with both excellent abrasion-resistance and desulfurization performance.

Chinese Patent CN 1151333A provides a new adsorbing composition comprising zinc oxide, silica, colloidal oxide and accelerant and a process for making the adsorbent. In the process, fluidizable particles are produced by pressure forming technique, and the particle pore volumes are increased by adding to the colloid a pore forming agent which becomes flammable when heated. The particles prepared by this process are comparatively big, and the particle size is within the range of about 100 to about 300 micron, which is not most favorable for the fluidization process. In addition, particles formed by adding a flammable pore forming agent to increase pore volume are frangible and have low strength.

U.S. Pat. No. 6,150,300, Chinese Patents CN 1130253C and CN 1258396C disclose a granular adsorbent composition comprising mixture of zinc oxide, silica, alumina, nickel or cobalt in a reduced state. The adsorbent is made by first mixing silica, alumina and zinc oxide under shearing, preparing solid particle through granulating machine, and impregnating it with nickel after drying and calcinating the particle. These patents do not disclose the physical-chemical properties, particularly the abrasion-resistance of the adsorbent, although the adsorbent disclosed in these patents has good desulfurization performance.

Chinese Patent CN 1208124C describes a process for making an adsorbent for removal of the sulfide contained in cracking gasoline. The process comprises the steps of impregnating an adsorbent carrier comprising zinc oxide, expanded perlite and alumina with metal accelerants such as cobalt and nickel, and subsequently reducing the accelerant at appropriate temperature. The abrasion-resistance of the adsorbent can be improved by adjusting the level of zinc oxide and binder (primarily alumina) in the adsorbent. Chinese Patent CN 1627988A further discusses in detail the major compounds produced under the reaction conditions. The physical-chemical properties of particles prepared by spray drying method in this patent are more suitable for fluidized-bed. Chinese Patents CN 1856359A and CN 1871063A disclose adsorbents having similar composition and process of making the same.

In the preparation methods of these adsorbents, alumina is added to conglutinate zinc oxide in order to improve the strength of the adsorbent, and expanded perlite is added to ensure the desired physical properties of the adsorbent. However, due to the existence of chemical reactions of zinc oxide during the adsorption desulfurization process, the structure of the adsorbent tends to be collapsed, resulting in lower adsorbent activity. Therefore, it is desirable for the person in the art to have an adsorbent with high desulfurization activity and excellent abrasion-resistance.

SUMMARY OF THE INVENTION

In one aspect, the present invention provides an adsorbent for removing sulfur from cracking gasoline or diesel fuel, which has excellent abrasion-resistance and desulfurization activity.

In another aspect, the present invention provides a process for making the above adsorbent.

In a further aspect, the present invention provides a use of the above adsorbent.

DETAILS ABOUT THE FIGURE

FIG. 1 is a diagram of metal distribution of the adsorbent according to the present invention and the adsorbent in the prior art by measurement of electroscope.

SPECIFIC MODES FOR CARRYING OUT THE PRESENT APPLICATION

The adsorbent according to the invention comprises, based on the total weight of the adsorbent:
1) from about 5 to about 35 wt % of alumina,
2) from about 3 to about 30 wt % of silica,
3) from about 10 to about 80 wt % of at least one oxide of metal selected from Groups IIB and VB,
4) from about 3 to about 30 wt % of at least one metal accelerant selected from Groups VIIB and VIII, and
5) from about 0.5 to about 10 wt % of at least one oxide of metal selected from Groups IA and IIA.

Preferably, the amount of alumina is in the range of from about 10 to about 25 wt %, the amount of silica is in the range of from about 10 to about 20 wt %, the amount of oxide of metal selected from Groups IIB and VB is in the range of from about 35 to about 65 wt %, the amount of metal accelerant is in the range of about 8 to about 20 wt %, and the amount of oxide of metal selected from Groups IA and IIA is in the range of about 1 to about 5 wt %.

More preferably, the amount of alumina is in the range of from about 12 to about 22 wt %, the amount of silica is in the range of from about 10 to about 16 wt %, and the amount of oxides of one or more metals selected from Groups IIB and VB is in the range of from about 40 to about 60 wt %, the amount of metal accelerant is in the range of about 10 to about 20 wt %, and the amount of oxides of one or more metals selected from Groups IA and IIA is in the range of about 1 to about 3 wt %.

The oxides of metals selected from Groups IIB and VB are metal oxides having sulfur storage capacity, preferably at least one oxides of vanadium or zinc, and most preferably zinc oxide.

The metal accelerant can be any metal capable of reducing oxidized sulfur to hydrogen sulfide, and can be metal selected from Group VIIB and Group VIII, preferably at least one metal selected from the group consisting of cobalt, nickel, iron, and manganese, and most preferably nickel.

The Group IA alkaline metal oxides are preferably oxides of sodium and/or potassium. The Group IIA alkaline earth metal oxides are preferably oxides of magnesium and/or calcium.

The Group IA or Group IIA metal oxides has a uniform distribution of metal in the entire adsorbent, preferably the adsorbent is in a form of microsphere. In particular, the average difference between the metal amount in the surface layer of adsorbent (calculated from the surface to the position having a depth of ⅕ radius of the adsorbent) and that in the inner layer of adsorbent (excluding the scope from the surface to the position having a depth of ⅕ radius of the adsorbent) is less than 20%.

The present invention also provides a process for preparing an adsorbent, comprising the steps of:
(1) mixing water, acid and binder or further mixing with at least one material selected from clay, silica source and Group IA metal compound/Group IIA metal compound to form a slurry, and aging the slurry to form an acidified slurry;
(2) mixing the acidified slurry with an oxide of metal selected from Groups IIB and VB and un-added material selected from clay, silica source and Group IA metal compound/Group IIA metal compound in step (1) to form a carrier mixture;
(3) molding, drying and calcinating the carrier mixture to form a carrier;
(4) introducing a compound comprising metal accelerant selected from Group VIIB and Group VIII onto the carrier, and drying and calcinating the carrier to form an adsorbent precursor; and
(5) reducing the adsorbent precursor under hydrogen containing atmosphere so that the accelerant metal is substantially presents in a reduced state.

The silica source is a nature mineral containing more than 70 wt % of silica. The nature mineral can further comprise other components, for example, $AlO_3$, $K_2O$, CaO, MgO, $Fe_2O_3$ and $TiO_2$ etc. The silica source can be selected from the group consisting of one or more of diatomite, silica sol, silica gel, macroporous silica and expanded perlite, preferably diatomite and/or expanded perlite.

The Group IIA metal compounds can be nitrate, chloride, formate, acetate, etc. of the Group II metal. The preferred Group IIA metal is magnesium and/or calcium. The Group IA metal compounds can be carbonate, bicarbonate, nitrate, chloride, formate, acetate, etc. of alkali metals, with carbonate, bicarbonate, formate and acetate being preferred. The preferred Group IA metal is sodium and/or potassium.

The clay is selected from the group consisting of one or more of kaolin, rectorite, Yunmeng clay, bentonite and montmorillonite, with kaolin being preferred. The clay contains more than 40 wt % of alumina and may comprises other component, such as $SiO_2$, $K_2O$, CaO, MgO, $Fe_2O_3$ and $TiO_2$ etc.

The binder is a material which can form heat resistant inorganic oxide upon calcination. The heat resistant inorganic oxide is one or more of alumina, silica and amorphous silica-alumina, with alumina being preferred. Preferably, the binder is selected from the group consisting of hydrated alumina, aluminum sol, boehmite, pseudo-boehmite, alumina trihydrate, and amorphous aluminium hydroxide. These various kinds of binders well known to the ordinary person skilled in the art are in the form of $\gamma$-$Al_2O_3$ after calcination. These binders are well known by the ordinary person skilled in the art.

The weight ratio of clay to binder is about 0.2-1.2:1, preferably about 0.1-0.8:1. The weight ratio of silica source and binder is about 0.5-1.5:1, preferably about 0.8-1.2:1.

The oxide of metals selected from Group IIB and VB is preferably selected from at least one of oxide of vanadium or zinc, and can be in the form of powder oxide and pre-prepared slurry of oxide by the methods well known to the ordinary person skilled in the art.

The metal accelerant can be any metal capable of reducing oxidized sulfur to hydrogen sulfide. The metal accelerant can be selected form Group VIIB and VIII metal, and preferably comprises one or more metals selected from the group consisting of cobalt, nickel, iron, and manganese, and most preferably comprises nickel.

The compound comprising metal accelerant is a material which can be converted to metal oxides under calcination conditions. The metal accelerant compound can be selected from the group consisting of acetate, carbonate, nitrate, sulfate, thiocyanate, oxide of the metal accelerant, and the mixture of two or more thereof. The preferred is nickel nitrate or nickel nitrate hexahydrate.

According to the process provided in the invention, the amounts of clay, silica source, binder, Group IA or IIA metal compound, oxide of metal selected from IIB and VB, and compound of metal accelerant selected from VIIB and VIII are selected such that the finalized adsorbent comprises, based on the total weight of the adsorbent, the following:
1) from about 5 to about 35 wt % of alumina;
2) from about 3 to about 30 wt % of silica;

3) from about 10 to about 80 wt % of at least one oxide of metal selected from Group IIB and VB;

4) from about 3 to about 30 wt % of at least one metal accelerant selected from Group VIIB and Group VIII; and 5) from about 0.5 to about 10 wt % of at least one oxide of metal selected from Group IA and IIA.

Preferably, the amount of alumina is from about 10 to about 25 wt %, the amount of silica is from about 10 to about 20 wt %, the amount of oxide of metal selected from Group IIB and VB is from about 35 to about 65 wt %, the amount of metal accelerant is from about 8 to about 20 wt %, and the amount of oxide of metal of Group IA or Group IIA is from about 1 to about 5 wt %.

More preferably, the amount of alumina is from about 12 to about 22 wt %, the amount of silica is from about 10 to about 16 wt %, the amount of oxide of metal selected from Group IIB and VB is from about 40 to about 60 wt %, the amount of metal accelerant is from about 10 to about 20 wt %, and the amount of oxide of metal of Group IA or Group IIA is from about 1 to about 3 wt %.

Specifically, the adsorbent of the invention can be prepared according to the following method.

In step (1) and step (2), the acid is selected from the group consisting of one or more water soluble inorganic acid and/or organic acid, preferably one or more of hydrochloric acid, nitric acid, phosphoric acid and acetic acid. The acid is preferably added after the other components are added. Adequate stirring is required while adding the acid. The amount of acid used is such that the pH of the slurry is from about 1 to about 5, preferably from 1.5 to about 4. The aging temperature is generally from about 60 to about 80° C., and the aging time is normally from about 1 to about 3 hours. The amount of water is used such that the concentration of the slurry is about 10 to about 20 wt %.

During the formation of carrier mixture, materials can be added in any order, wherein clay, silica source and Group IA or Group IIA metal compound can be added either in the step (1) or in the step (2). One of the preferred methods comprises: a. water, acid, binder, clay, silica source are mixed to form a slurry, and the slurry is aged to form an acidified slurry in step (1); and b. the acidified slurry is added with oxide of metal selected from Group IIB and VB and Group IA or IIA metal compound to form carrier mixture in step (2). Another preferred method comprises: a. clay, binder and acid solution are mixed to form a slurry, and the slurry is aged to form an acidified slurry in step (1); b. silica source and Group IA or IIA metal compound are mixed, dried and calcinated at 400-600° C. to obtain pre-treated silica source; and c. the acidified slurry is added with at least one oxide of metal selected from Group IIB and VB and pre-treated silica source to form carrier mixture in step (2).

In step (3), the carrier mixture is molded into extrudate, sheet, pellet, sphere, or microspheric particle. For example, the carrier mixture can be molded (preferably extruded) into particles, preferably be molded into cylinderic extrudate with a diameter of about 1.0 to about 8.0 mm and a length of about 2.0 to about 5.0 mm when it is dough or paste mixture. The extrudate thus obtained is subsequently dried and calcinated. The mixture produced can be thickened, dried and molded when it is in a form of wet mixture. More preferred carrier mixture can be molded by spray drying into microspheres with a particle size of about 20 to about 200 micron when it is a slurry. To facilitate spray drying, the slurry has a solids content of about 10 to about 50 wt. %, preferably about 20 to about 50 wt. % before drying.

The methods and conditions for drying the molded carrier mixture are known for the ordinary person skilled in the art. The drying methods may be for example airing, baking, and blow drying. The drying temperature can be in the range of from room temperature to about 400° C., preferably about 100 to about 350° C.

The calcinating conditions for the molded carrier mixture are also known for the ordinary person skilled in the art. Generally, the calcinating temperature is about 500 to about 800° C., preferably about 650 to about 750° C., and the calcinating time is at least about 2 hours, preferably about 2 to about 100 hours, most preferably about 2 to about 10 hours.

In step (4), the metal accelerant can be introduced into the carrier by impregnation or precipitation well known in the art. The impregnation is performed by impregnating the calcinated carrier by a solution or suspension of the compound containing metal accelerant. The precipitation is performed by first mixing the solution or suspension of the compound containing metal accelerant with the adsorbent carrier, and then adding ammonia to precipitate the metal compound onto the carrier.

In step (4), the carrier introduced with metal accelerant is dried at about 50 to about 300° C., preferably about 100 to about 250° C., for about 0.5 to about 8 hour, preferably about 1 to about 5 hour. Thereafter, the carrier is calcinated at about 300 to about 800° C., preferably at about 450 to about 750° C. in the presence of oxygen or oxygen containing atmosphere for about 0.5 to about 4 hour, preferably about 1 to about 3 hour, till the volatile materials are removed and the accelerant metals are transformed into metal oxide, thereby obtaining adsorbent precursor.

In step (5), the adsorbent precursor is reduced at about 300 to about 600° C. under hydrogen containing atmosphere to obtain the adsorbent according to the invention with the accelerant metals being substantially in reduced state. Preferably, the reduction temperature is about 400 to about 500° C., the hydrogen content is about 10 to about 60 vol. %, and the reduction time is about 0.5 to about 6 hour, more preferably about 1 to about 3 hour.

The present invention further provides a method for desulfurizing cracking gasoline or diesel fuel, comprising fully contacting the sulfur containing feed with the adsorbent according to the invention at about 350 to about 500° C., preferably about 400 to about 450° C., during which the sulfur contained in the feed is adsorbed in the adsorbent and thus a product having low sulfur content is obtained, wherein the adsorbent can be recycled after going through oxidation-reduction regeneration process.

The contacting is preferably conducted in a fluidized bed.

The term "cracking gasoline" used herein means hydrocarbons having a boiling range of about 40 to about 210° C. or any fractions thereof produced by thermal cracking or by catalytic cracking higher hydrocarbon molecules into small molecules. Suitable thermal cracking processes include but not limited to pyrolysis, thermal cracking, visbreaking and the combination thereof. Examples of suitable catalytic cracking process include but not limited to fluidized-bed catalytic cracking and heavy oil catalytic cracking and the combination thereof. Therefore, suitable catalytic cracking gasoline includes but not limited to coked gasoline, thermal cracking gasoline, visbreaking gasoline, fluidized-bed catalytic cracking gasoline, heavy oil cracking gasoline and the combination thereof. According to the process of the invention, it is possible in some cases to fractionate and/or hydrogenate the cracking gasoline prior to desulfurization when used as hydrocarbon containing fluid.

The term "diesel fuel" used herein means hydrocarbon mixture having a boiling range of about 170 to about 450° C. or liquid composed of any fractions thereof. Such hydrocarbon containing fluids include but not limited to light cycle oil, kerosene, straight-run diesel oil, hydrogenated diesel oil and the combination thereof.

The term "sulfur" used herein means element sulfur in any forms, such as organic sulfide existing in hydrocarbon containing liquid such as cracking gasoline or diesel fuel. Sulfur contained in the hydrocarbon containing liquid according to the present invention includes but are not limited to carbonyl sulfide (COS), carbon disulfide ($CS_2$), mercaptans or other thiophene compounds and the combination thereof, particularly thiophene, benzothiophene, alkylthiophene, alkylbenzothiophene, and alkyldibenzothiophene, and thiophene compounds having higher molecular weight which are usually contained in diesel fuel.

The adsorbent according to the present invention has very high abrasion-resistance and desulfurizing activity and can greatly increase the life of the adsorbent. It is suitable for use in the adsorption desulfurization process.

EXAMPLES

While embodiments of the present disclosure are described in connection with the above embodiments and the corresponding text and figures, there is no intent to limit the disclosure to the embodiments in these descriptions. On the contrary, the intent is to cover all alternatives, modifications, and equivalents included within the spirit and scope of embodiments of the present disclosure.

The present invention will be further illustrated with reference to the following examples, but not limited thereby.

The compositions of the adsorbents in the examples were examined by X ray fluorescence spectrometry (XRF).

Example 1

0.80 kg of expanded perlite (World minerals Corporations, M27, having a dry basis of 0.79 kg, and containing 72 wt % of silica and 19 wt % of alumina, with the rest of $K_2O$, MgO, $Fe_2O_3$, etc.) and 120 g of anhydrous sodium carbonate were added in 1.5 kg of water to form a solution and mixed homogeneously. Then, the solvent was evaporated and the mixture was calcinated at 600° C. for 1 hour to produce treated expanded perlite.

0.71 kg of kaolin (Suzhou Kaolin Factory, S1, having a dry basis of 0.59 kg, and containing 44 wt % of alumina, 50 wt % of silica, with the rest of CaO, $Fe_2O_3$ and $TiO_2$, etc.), 1.15 kg of alumina hydrate (SB powder, having a dry basis of 0.78 kg) and 9.0 kg of neutralized water (pH 6-8) were mixed while stirring to form a homogenous mixture. Then, 75 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.5 kg of zinc oxide (containing 3.43 kg of pure zinc oxide) powder and the above treated expanded perlite were added to the mixture. After 1 hour of mixing and stirring, a slurry of carrier was obtained.

The slurry was spray dried using a Niro Bowen Nozzle Tower™ spray drier, with a pressure of 8.0-5.5 MPa, an inlet temperature of less than 480° C., and an outlet temperature of about 150° C. The microspheres thus produced were calcinated at 735° C. for 1 hour to obtain the adsorbent carrier.

3.24 kg of adsorbent carrier (having a dry basis of 3.0 kg) was impregnated with 3.04 kg of nickel nitrate hexahydrate and 1.2 kg of deionized water. The mixture thus obtained was dried at 180° C. for 4 hours, followed by calcination in the air atmosphere at 735° C. for 1 hour to produce adsorbent precursor. The adsorbent precursor was reduced in the hydrogen atmosphere at 425° C. for 2 hours to obtain adsorbent, which is reported as A1.

The chemical composition of adsorbent A1 is as follows: 51.2 wt % of zinc oxide, 17.8 wt % of alumina, 12.9 wt % of silica, 15.5 wt % of nickel (calculated as metal nickel), and 1.0 wt. % of sodium oxide.

Example 2

0.92 kg of expanded perlite (World minerals Corporations, M27, having a dry basis of 0.91 kg), 0.49 kg of kaolin (Suzhou Kaolin Factory, S1, having a dry basis of 0.41 kg), 1.55 kg of alumina hydrate (SB powder, having a dry basis of 1.05 kg) and 9.0 kg of neutralized water (pH 6-8) were mixed while stirring to form a homogenous mixture. Then, 90 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.16 kg of zinc oxide (containing 3.1 kg of pure zinc oxide) powder and 237 g of potassium formate were added to the mixture. After 1 hour of mixing and stirring, a slurry of carrier was obtained.

Adsorbent A2 was obtained by spray drying and molding the carrier followed by introducing active component nickel according to the method applied in Example 1. The chemical composition of adsorbent A2 is as follows: 46.3 wt % of zinc oxide, 20.9 wt % of alumina, 12.9 wt % of silica, 16.2 wt % of nickel (calculated as metal nickel), and 2.1 wt. % of potassium oxide.

Example 3

0.65 kg of diatomite (World minerals Corporations, having a dry basis of 0.58 kg, and containing 86.7 wt % of silica and 7.5 wt % of alumina, with the rest of impurities such as CaO and $Fe_2O_3$, etc.) and 0.3 kg of sodium bicarbonate were added in 1.0 kg of water to form a solution and mixed homogeneously. Then, the solvent was evaporated and the mixture was calcinated at 600° C. for 1 hour to produce treated diatomite.

0.66 kg of kaolin (Suzhou Kaolin Factory, S1, having a dry basis of 0.55 kg), 1.03 kg of alumina hydrate (SB powder, having a dry basis of 0.70 kg) and 9.0 kg of neutralized water (pH 6-8) were mixed while stirring to form a homogenous mixture. Then, 70 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 4.0 kg of zinc oxide (containing 3.92 kg of pure zinc oxide) powder and the above treated diatomite were added to the mixture. After 1 hour of mixing and stirring, a slurry of carrier was obtained.

Adsorbent A3 was obtained by spray drying and molding the carrier followed by introducing active component nickel according to the method applied in Example 1. The chemical composition of adsorbent A2 is as follows: 58.0 wt % of zinc oxide, 14.6 wt % of alumina, 11.6 wt % of silica, 13.0 wt % of nickel (calculated as metal nickel), and 2.6 wt. % of sodium oxide.

Example 4

0.80 kg of expanded perlite (World minerals Corporations, M27, having a dry basis of 0.79 kg), 0.71 kg of kaolin (Suzhou Kaolin Factory, S1, having a dry basis of 0.59 kg, and containing 44 wt % of alumina and 50 wt % of silica, with the rest of CaO, $Fe_2O_3$, $TiO_2$, etc.), 1.55 kg of alumina hydrate (SB powder, having a dry basis of 1.05 kg) and 9.0 kg of neutralized water (pH 6-8) were mixed while stirring to form a homogenous mixture. Then, 75 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.5 kg of zinc oxide (containing 3.43 kg of pure zinc oxide) powder and 120 g of anhydrous sodium carbonate were added to the mixture. After 1 hour of mixing and stirring, a slurry of carrier was obtained.

Adsorbent A4 was obtained by spray drying and molding the carrier followed by introducing active component nickel according to the method applied in Example 1. The chemical composition of adsorbent A4 is the same as that of adsorbent A1.

Example 5

0.80 kg of expanded perlite (World minerals Corporations, M27, having a dry basis of 0.79 kg, and containing 72 wt % of silica and 19 wt % of alumina, with the rest of $K_2O$, MgO, $Fe_2O_3$, etc.) and 450 g of magnesium nitrate hexahydrate were added to 1.5 kg of water to form a solution and mixed homogeneously. Then, the solvent was evaporated and the mixture was calcinated at 500° C. for 1 hour to produce treated expanded perlite.

0.71 kg of kaolin (Suzhou Kaolin Factory, S1, having a dry basis of 0.59 kg, and containing 44 wt % of alumina, 50 wt % of silica, with the rest of CaO, $Fe_2O_3$ and $TiO_2$, etc.), 1.15 kg of alumina hydrate (SB powder, having a dry basis of 0.78 kg) and 9.0 kg of neutralized water (pH 6-8) were mixed while stirring to form a homogenous mixture. Then, 75 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.5 kg of zinc oxide (containing 3.43 kg of pure zinc oxide) powder and the above treated expanded perlite were added to the mixture. After 1 hour of mixing and stirring, a slurry of carrier was obtained.

Adsorbent A5 was obtained by spray drying and molding the carrier followed by introducing active component nickel according to the method applied in Example 1. The chemical composition of adsorbent A5 is as follows: 51.2 wt % of zinc oxide, 17.8 wt % of alumina, 12.9 wt % of silica, 15.5 wt % of nickel (calculated as metal nickel), and 1.0 wt. % of magnesium oxide.

Example 6

0.92 g of expanded perlite (World minerals Corporations, M27, having a dry basis of 0.91 g), 0.49 g of kaolin (Suzhou Kaolin Factory, S1, having a dry basis of 0.41 g), 1.55 kg of alumina hydrate (SB powder, having a dry basis of 1.05 kg) and 9.0 kg of neutralized water (pH 6-8) were mixed while stirring to form a homogenous mixture. Then, 90 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.16 kg of zinc oxide (containing 3.1 kg of pure zinc oxide) powder and 0.9 kg of magnesium nitrate hexahydrate were added to the mixture. After 1 hour of mixing and stirring, a slurry of carrier was obtained.

Adsorbent A6 was obtained by spray drying and molding the carrier followed by introducing active component nickel according to the method applied in Example 1. The chemical composition of adsorbent A6 is as follows: 46.3 wt % of zinc oxide, 20.9 wt % of alumina, 12.9 wt % of silica, 16.2 wt % of nickel (calculated as metal nickel), and 2.1 wt. % of magnesium oxide.

Example 7

0.98 kg of diatomite (World minerals Corporations, having a dry basis of 0.88 kg, and containing 86.7 wt % of silica and 7.5 wt % of alumina, with the rest of impurities such as CaO and $Fe_2O_3$, etc.) and 0.35 kg of calcium chloride (calculated as having no crystal water) were added to 1.0 kg of water to form a solution and mixed homogeneously. Then, the solvent was evaporated and the mixture was calcinated at 700° C. for 1 hour to produce treated diatomite.

0.66 kg of kaolin (Suzhou Kaolin Factory, S1, having a dry basis of 0.55 kg), 1.12 kg of pseudo-boehmite (having a dry basis of 0.70 kg, primarily composed of alumina) and 9.0 kg of neutralized water (pH 6-8) were mixed while stirring to form a homogenous mixture. Then, 70 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.59 kg of zinc oxide (containing 3.52 kg of pure zinc oxide) powder and the above treated diatomite were added to the mixture. After 1 hour of mixing and stirring, a slurry of carrier was obtained.

Adsorbent A7 was obtained by spray drying and molding the carrier followed by introducing active component nickel according to the method applied in Example 1. The chemical composition of adsorbent A7 is as follows: 51.8 wt % of zinc oxide, 15.0 wt % of alumina, 16.5 wt % of silica, 12.9 wt % of nickel (calculated as metal nickel), and 2.6 wt. % of calcium oxide.

Example 8

0.92 kg of expanded perlite (World minerals Corporations, M27, having a dry basis of 0.91 kg, and containing 72 wt % of silica and 19 wt % of alumina, with the rest of $K_2O$, MgO, $Fe_2O_3$, etc.) and 900 g of magnesium nitrate hexahydrate were added to 2.5 kg of water to form a solution and mixed homogeneously. Then, the solvent was evaporated and the mixture was calcinated at 500° C. for 1 hour to produce treated expanded perlite.

0.4 kg of kaolin (Suzhou Kaolin Factory, S1, having a dry basis of 0.41 kg), 1.55 kg of alumina hydrate (SB powder, having a dry basis of 1.05 kg) and 9.0 kg of neutralized water (pH 6-8) were mixed while stirring to form a homogenous mixture. Then, 90 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.16 kg of zinc oxide (containing 3.1 kg of pure zinc oxide) powder and the above treated expanded perlite were added to the mixture. After 1 hour of mixing and stirring, a slurry of carrier was obtained.

Adsorbent A8 was obtained by introducing active component nickel according to the method applied in Example 6. The chemical composition of adsorbent A8 is the same as that of adsorbent A6.

Example 9

0.98 kg of diatomite (World minerals Corporations, having a dry basis of 0.88 kg, and containing 86.7 wt % of silica and 7.5 wt % of alumina, with the rest of impurities such as CaO and $Fe_2O_3$, etc.), 0.20 kg of calcium chloride (calculated as having no crystal water) and 0.16 kg of sodium bicarbonate were added to 1.0 kg of water to form a solution and mixed homogeneously. Then, the solvent was evaporated and the mixture was calcinated at 700° C. for 1 hour to produce treated diatomite.

0.66 kg of kaolin (Suzhou Kaolin Factory, S1, having a dry basis of 0.55 kg), 1.12 kg of pseudo-boehmite (having a dry basis of 0.70 kg, primarily composed of alumina) and 9.0 kg of neutralized water (pH 6-8) were mixed while stirring to form a homogenous mixture. Then, 70 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.59 kg of zinc oxide (containing 3.52 kg of pure zinc oxide) powder and the above treated diatomite were added to the mixture. After 1 hour of mixing and stirring, a slurry of carrier was obtained.

Adsorbent A9 was obtained by spray drying and molding the carrier followed by introducing active component nickel according to the method applied in Example 1. The chemical composition of adsorbent A9 is as follows: 51.8 wt % of zinc oxide, 15.0 wt % of alumina, 16.5 wt % of silica, 12.9 wt % of nickel (calculated as metal nickel), 1.5 wt. % of calcium oxide, and 1.1 wt. % of sodium oxide.

Comparative Example 1

The difference lies in that no sodium or magnesium salt was added as compared with Examples 1, 4, and 5.

0.71 kg of kaolin (Suzhou Kaolin Factory, S1, having a dry basis of 0.59 kg), 1.15 kg of alumina hydrate (SB powder, having a dry basis of 0.78 kg) and 9.0 kg of neutralized water (pH 6-8) were mixed while stirring to form a homogenous mixture. Then, 75 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.5 kg of zinc oxide (containing 3.43 kg of pure zinc oxide) powder and the 0.8 kg of expanded perlite (having a dry basis of 0.79 kg) were added to the mixture. After 1 hour of mixing and stirring, a slurry of carrier was obtained.

Adsorbent B1 was obtained by spray drying and molding the carrier followed by introducing active component nickel according to the method applied in Example 1. The chemical composition of adsorbent B1 is as follows: 51.7 wt % of zinc oxide, 18.0 wt % of alumina, 13.0 wt % of silica, and 15.7 wt % of nickel (calculated as metal nickel).

Comparative Example 2

The difference lies in that no potassium or magnesium salt was added as compared with Examples 2, 6, and 8.

0.92 kg of expanded perlite (World minerals Corporations, M27, having a dry basis of 0.91 kg), 0.49 kg of kaolin (Suzhou Kaolin Factory, S1, having a dry basis of 0.41 kg), 1.55 kg of alumina hydrate (SB powder, having a dry basis of 1.05 kg) and 9.0 kg of neutralized water (pH 6-8) were mixed while stirring to form a homogenous mixture. Then, 90 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.16 kg of zinc oxide (containing 3.1 kg of pure zinc oxide) powder and 237 kg of potassium formate were added to the mixture. After 1 hour of mixing and stirring, a slurry of carrier was obtained.

Adsorbent B2 was obtained by spray drying and molding the carrier followed by introducing active component nickel according to the method applied in Example 1. The chemical composition of adsorbent B2 is as follows: 47.2 wt % of zinc oxide, 21.4 wt % of alumina, 13.2 wt % of silica, and 16.6 wt % of nickel (calculated as metal nickel).

Comparative Example 3

The difference lies in that no sodium salt was added as compared with Example 3.

0.65 kg of diatomite (World minerals Corporations, having a dry basis of 0.58 kg, and containing 86.7 wt % of silica and 7.5 wt % of alumina, with the rest of impurities such as CaO and $Fe_2O_3$, etc.), 0.66 kg of kaolin (Suzhou Kaolin Factory, S1, having a dry basis of 0.55 kg), 1.03 kg of alumina hydrate (SB powder, having a dry basis of 0.70 kg) and 9.0 kg of neutralized water (pH 6-8) were mixed while stirring to form a homogenous mixture. Then, 70 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 4.0 kg of zinc oxide (containing 3.92 kg of pure zinc oxide) powder was added to the mixture. After 1 hour of mixing and stirring, a slurry of carrier was obtained.

Adsorbent B3 was obtained by spray drying and molding the carrier followed by introducing active component nickel according to the method applied in Example 1. The chemical composition of adsorbent B3 is as follows: 59.5 wt % of zinc oxide, 15.0 wt % of alumina, 11.9 wt % of silica, 13.4 wt % of nickel (calculated as metal nickel).

Comparative Example 4

The difference lies in that no calcium and/or sodium salt was added as compared with Examples 7, 9.

0.66 kg of kaolin (Suzhou Kaolin Factory, S1, having a dry basis of 0.55 kg), 1.12 kg of pseudo-boehmite (having a dry basis of 0.70 kg, primarily composed of alumina) and 9.0 kg of neutralized water (pH 6-8) were mixed while stirring to form a homogenous mixture. Then, 70 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 3.59 kg of zinc oxide (containing 3.52 kg of pure zinc oxide) powder and the 0.98 kg of diatomite (World Minerals Corporations, having a dry basis of 0.88 kg, and containing 86.7 wt % of silica and 7.5 wt % of alumina, with the rest of impurities such as CaO and $Fe_2O_3$, etc.) were added to the mixture. After 1 hour of mixing and stirring, a slurry of carrier was obtained.

Adsorbent B4 was obtained by spray drying and molding the carrier followed by introducing active component nickel according to the method applied in Example 1. The chemical composition of adsorbent B4 is as follows: 53.2 wt % of zinc oxide, 15.4 wt % of alumina, 16.9 wt % of silica, and 13.2 wt % of nickel (calculated as metal nickel).

Comparative Example 5

The difference lies in that sodium salt was added by impregnation as compared with Example 3.

0.65 kg of diatomite (World Minerals Corporations, having a dry basis of 0.58 kg, and containing 86.7 wt % of silica and 7.5 wt % of alumina, with the rest of impurities such as CaO and $Fe_2O_3$, etc.), 0.66 kg of kaolin (Suzhou Kaolin Factory, S1, having a dry basis of 0.55 kg), 1.03 kg of alumina hydrate (SB powder, having a dry basis of 0.70 kg) and 9.0 kg of neutralized water (pH 6-8) were mixed while stirring to form a homogenous mixture. Then, 70 g of concentrated nitric acid (chemically pure, available from Beijing Chemical Works) was added to the mixture while stirring and the temperature of mixture was raised to above 60° C. to acidify the mixture for 1 hour. When the temperature of the mixture dropped to below 40° C., 4.0 kg of zinc oxide (containing 3.92 kg of pure zinc oxide) powder was added to the mixture. After 1 hour of mixing and stirring, a slurry of carrier was obtained.

A carrier of adsorbent is obtained by spray drying and molding the carrier according to the method applied in Example 1. 3.25 kg of carrier of adsorbent and 0.27 kg of sodium bicarbonate were added in 1.0 kg of water to form a solution and mixed homogeneously. Then, the solvent was evaporated and the mixture was calcinated at 600° C. for 1 hour to produce treated carrier.

Adsorbent B5 was obtained by introducing active component nickel into the above carrier according to the method applied in Example 1. The chemical composition of adsorbent B5 is as follows: 58.0 wt % of zinc oxide, 14.6 wt % of alumina, 11.6 wt % of silica, 13.0 wt % of nickel (calculated as metal nickel) and 2.6 wt % of sodium oxide.

Example 10

The distribution of alkali metal incorporated in the adsorbent by various methods is measured by electronic microscope.

The adsorbent microsphere is dispersed in resin, and then is cut into sheet with using Ion milling (Model 691) of Gaten Co. after the resin is solidified. The contents of sodium in the longitudinal direction of the samples are analyzed by QUANTA 200F+EDAX, and the results are shown in FIG. 1. The conditions for testing include: accelerating voltage: 20 kV, dissolution: 2 nm, beam: 3.0-4.0, working distance: 9.8-10.3 mm, probe model: ETD, working pressure: 80 Pa.

As can be seen from FIG. 1, the adsorbent A3 prepared according to the process of the present invention has a uniform distribution of sodium metal through the whole microsphere, while the adsorbent B5 prepared according to the prior art has a different distribution of sodium metal in the surface and the inside of the microsphere. The content of sodium in the surface layer (analyzing the sodium content in the longitudinal direction of the adsorbent by SEM+EDAX, and calculating the average value of sodium content in all points in the surface layer on both sides) of adsorbent A3 is 1.9 wt %, and the content of sodium in the inner layer (the average value of sodium content in all points in the inner layer) of the adsorbent A3 is 1.9 wt %. The content of sodium in the surface layer of adsorbent B5 is 2.5 wt %, and the content of sodium in the inner layer of the adsorbent B5 is 1.6 wt %. As shown in Table 1, adsorbent A3 has an enhanced strength of skeleton of adsorbent and higher abrasion resistance strength as compared with adsorbent B5.

Example 11

Both abrasion-resistant strength and desulfurization performance of the adsorbents prepared by various methods are measured, and the results are reported in Table 1. The strength of the adsorbent is measured by straight tube abrasion method in accordance with the method of RIPP 29-90 described in "Petrochemical Analysis Method (RIPP experimentation)". The smaller the numerical value is, the higher the abrasion-resistant strength is. In order to better represent the activity of adsorbent in the industrial applications, the strength of the vulcanized adsorbent was also evaluated. Specifically, appropriated amount of adsorbent was placed in the fluidized bed charged with a mixed gases of hydrogen sulfide (50 vol. %) and nitrogen (50 vol. %), then heated to 400° C. to be vulcanized for 1 hour.

The desulfurization performance is measured by sulfur content of the product, which is indicated by off-line chromatographic analysis.

Meanwhile, the following methods were employed to evaluate the desulfurization performance of these adsorbents. A fixed-bed micro-reaction system is used to evaluate the desulfurization performance of the adsorbents. The feed for adsorbing reaction is catalytic cracking gasoline having a sulfur content of 800 ppm. The adsorbing test was performed under hydrogen atmosphere at the temperature of 410° C. and the weight space velocity of the adsorption reaction is 4 $h^{-1}$. In order to accurately characterize the activity of the adsorbent in the actual industrial operation, the adsorbents were regenerated after the reaction under air atmosphere at 550° C. After four cycles of regeneration, the adsorbents were stabilized as for its activity. The sulfur contents of the product gasoline desulfurized with the stabilized adsorbent were used as indicative of the activity of the adsorbent. The sulfur contents of the product gasoline are shown in Table 2. The sulfur contents of the adsorbent after reaction were analyzed, and the results are shown in Table 2.

TABLE 1

The strengths of adsorbents before and after desulfurization

| Adsorbent | A1 | A2 | A3 | A4 | A5 | A6 | A7 | A8 | A9 | B1 | B2 | B3 | B4 | B5 |
|---|---|---|---|---|---|---|---|---|---|---|---|---|---|---|
| Abrasion index (fresh) | 7.6 | 5.7 | 8.0 | 7.6 | 7.7 | 5.7 | 8.1 | 5.7 | 7.6 | 7.7 | 5.7 | 8.3 | 8.1 | 8.1 |
| Abrasion index (after desulfurization) | 8.0 | 6.0 | 8.2 | 8.1 | 8.5 | 6.4 | 8.6 | 5.9 | 7.9 | 13.2 | 8.9 | 14.3 | 13.4 | 12.3 |

TABLE 2

The adsorption desulfurization performances of adsorbents

|  | A1 | A2 | A3 | A4 | A5 | A6 | A7 | A8 | A9 | B1 | B2 | B3 | B4 | B5 |
|---|---|---|---|---|---|---|---|---|---|---|---|---|---|---|
| Sulfur content of product gasoline/ppm | 28 | 41 | 25 | 29 | 31 | 45 | 45 | 43 | 43 | 29 | 42 | 26 | 46 | 27 |
| Sulfur content of adsorbent/wt % | 10.6 | 9.3 | 11.9 | 10.5 | 10.3 | 9.3 | 9.3 | 9.4 | 9.2 | 10.4 | 9.3 | 12.0 | 9.2 | 11.8 |
| Δ(RON + MON)/2 | 0.1 | 0.1 | 0.05 | 0.1 | 0.1 | 0.15 | 0.1 | 0.15 | 0.10 | 0.4 | 0.45 | 0.4 | 0.4 | 0.2 |

The sulfur content of the raw gasoline is 645 ppm, the RON is 93.4, and the MON is 82.3.

Many variations and modifications may be made to the above-described embodiments. All such modifications and variations are intended to be included herein within the scope of this disclosure and protected by the following claims.

The invention claimed is:

1. A desulfurization adsorbent comprising,:
   1) from about 5 to about 35 wt % of alumina,
   2) from about 3 to about 30 wt % of silica,
   3) from about 10 to about 80 wt % of at least one oxide of metal selected from Groups IIB and VB,
   4) from about 3 to about 30 wt % of at least one metal accelerant selected from Groups VIIB and VIII, and
   5) from about 0.5 to about 10 wt % of at least one oxide of metal selected from Groups IA and IIA,
   based on the total weight of the adsorbent;
   wherein oxide of metal selected from Groups IA and IIA has a uniform distribution of metal in the entire adsorbent, and wherein the silica of component 2) is not the source of the at least one oxide of metal selected from Groups IA and IIA of component 5).

2. The adsorbent according to claim 1 wherein the amount of alumina is in the range of from about 10 to about 25 wt %, the amount of silica is in the range of from about 10 to about 20 wt %, the amount of oxide of metal selected from Groups IIB and VB is in the range of from about 35 to about 65 wt %, the amount of metal accelerant is in the range of about 8 to about 20 wt %, and the amount of oxide of metal selected from Groups IA and IIA is in the range of about 1 to about 5 wt %.

3. The adsorbent according to claim 1 wherein said at least one oxide of metal selected from Groups IIB and VB is oxide of vanadium or zinc.

4. The adsorbent according to claim 1 wherein said at least one metal accelerant is metal selected from the group consisting of cobalt, nickel, iron and manganese.

5. The adsorbent according to claim 1 wherein the Group IIA metal oxides comprise oxides of magnesium and/or calcium, and the Group IA metal oxides comprise oxides of sodium and/or potassium.

6. A process for preparing an adsorbent of claim 1, comprising the steps of:
   (1) mixing water, acid and binder or further mixing with at least one material selected from clay, silica source and Group IA metal compound/Group IIA metal compound to form a slurry, and aging the slurry to form an acidified slurry;
   (2) mixing the acidified slurry with an oxide of metal selected from Groups IIB and VB and un-added material selected from clay, silica source and Group IA metal compound/Group IIA metal compound in step (1) to form a carrier mixture;
   (3) molding, drying and calcinating the carrier mixture to form a carrier;
   (4) introducing a compound comprising metal accelerant selected from Group VIIB and Group VIII onto the carrier, and drying and calcinating the carrier to form an adsorbent precursor; and
   (5) reducing the adsorbent precursor under hydrogen containing atmosphere so that the accelerant metal is substantially present in a reduced state.

7. The process according to claim 6, wherein the silica source can be selected from the group consisting of one or more of diatomite, silica sol, silica gel, macroporous silica and expanded perlite.

8. The process according to claim 6 wherein the clay is selected from the group consisting of one or more of kaolin, rectorite, Yunmeng clay, bentonite and montmorillonite.

9. The process according to claim 6, wherein the binder is selected from the group consisting of one or more of hydrated alumina, aluminum sol, boehmite, pseudo-boehmite, alumina trihydrate, and amorphous aluminium hydroxide.

10. The process according to claim 6 or claim 9 wherein the weight ratio of clay to binder is from about 0.2 to about 1.2:1, and the weight ratio of silica source and binder is from about 0.5 to about 1.5:1.

11. The process according to claim 6 wherein the Group IIA metal compound is selected from the group consisting of one or more of nitrate, chloride, formate and acetate of the Group II metal, and the Group IA metal compound is selected from the group consisting of one or more of carbonate, bicarbonate, nitrate, chloride, formate, acetate of Group IA metal.

12. The process according to claim 6 wherein the compound comprising metal accelerant is at least one selected from the group consisting of acetate, carbonate, nitrate, sulfate, thiocyanate and oxide of the metal accelerant.

13. The process according to claim 6 wherein water, acid, binder and clay, silica source are mixed to form a slurry, and the slurry is aged to form an acidified slurry in step (1), and the acidified slurry is added with oxide of metal selected from Group IIB and VB, Group IA or IIA metal compound to form a carrier mixture in step (2).

14. The process according to claim 6 wherein water, acid, binder and clay are mixed, and then aged to form an acidified slurry in step (1); and the acidified slurry is added with oxide of metal selected from Group IIB and VB and pre-treated silica source to form a carrier mixture, wherein pre-treated silica source is obtained by mixing silica source and Group IA or IIA metal compound, and drying and calcinating said carrier mixture at about 400° C. to about 600° C. in step (2).

15. The process according to claim 6, 13 or 14 wherein, in step (1), the acid is selected from one or more water soluble inorganic acid and/or organic acid, and the amount of acid used is such that the pH of the slurry is from about 1 to about 5, the amount of water used is such that the concentration of the slurry is from about 10 to about 20 wt %.

16. The process according to claim 6, 13 or 14 wherein the aging temperature is from about 60 to about 80° C., and the aging time is from about 1 to about 3 hours in step (1).

17. The process according to claim 6 wherein the carrier mixture is in the form of slurry having a solids of from about 10 to about 50 wt %, and the carrier mixture is molded by spray drying into microspheres having a particle size of from about 20 to about 200 micron, dried at from room temperature to about 400 C and calcinated at from about 500 to about 800° C. in step (3).

18. The process according to claim 6 wherein the metal accelerant is introduced into the carrier by impregnation or precipitation, and the carrier is dried at from about 50 to about 300° C., and calcinated at from about 300 to about 800° C. in step (4).

19. A method for desulfurizing cracking gasoline or diesel fuel, comprising fully contacting the sulfur containing feed with the adsorbent according to any one of the claims 1 to 5 at about 350 to about 500° C., and collecting the product having lowered sulfur content.

20. The method of claim 19 wherein the contacting is conducted in a fluidized bed.

* * * * *